US012662026B2

(12) United States Patent
Mo

(10) Patent No.: US 12,662,026 B2
(45) Date of Patent: Jun. 23, 2026

(54) CHILD SAFETY SEAT

(71) Applicant: Wonderland Switzerland AG, Steinhausen (CH)

(72) Inventor: Xiaolong Mo, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 220 days.

(21) Appl. No.: 17/834,956

(22) Filed: Jun. 8, 2022

(65) Prior Publication Data

US 2022/0396182 A1      Dec. 15, 2022

(30) Foreign Application Priority Data

Jun. 9, 2021    (CN) ......................... 202110642262.8

(51) Int. Cl.
*B60N 2/28*             (2006.01)

(52) U.S. Cl.
CPC ......... *B60N 2/2851* (2013.01); *B60N 2/2803* (2013.01); *B60N 2/2812* (2013.01); *B60N 2/2881* (2013.01); *B60N 2/2816* (2023.08)

(58) Field of Classification Search
CPC .. B60N 2/2851; B60N 2/2812; B60N 2/2881; B60N 2/803
See application file for complete search history.

(56) References Cited

U.S. PATENT DOCUMENTS

| | | | |
|---|---|---|---|
| 6,698,841 B1 | 3/2004 | Glover | |
| 8,123,294 B2 * | 2/2012 | Hutchinson | .......... B60N 2/2812 |
| | | | 297/250.1 |
| 9,126,509 B2 | 9/2015 | Biaud | |
| 2012/0181829 A1 | 7/2012 | Williams | |

FOREIGN PATENT DOCUMENTS

| | | | | |
|---|---|---|---|---|
| CN | 101670799 A | 3/2010 | | |
| CN | 201712500 U | 1/2011 | | |
| CN | 205573678 U | 9/2016 | | |
| CN | 106004574 A | 10/2016 | | |
| CN | 107627917 A | 1/2018 | | |
| CN | 111267692 A | 6/2020 | | |
| DE | 20 2011 002 071 U1 | 4/2011 | | |
| GB | 2282321 A * | 4/1995 | .......... | B60N 2/2812 |

OTHER PUBLICATIONS

Office action mailed/issued on Aug. 30, 2023 for DE application No. 10 2022 114 258.2, pp. 1-5, Aug. 30, 2023.
(Continued)

*Primary Examiner* — Anthony D Barfield
(74) *Attorney, Agent, or Firm* — Winston Hsu

(57)      ABSTRACT
The present disclosure relates to a child safety seat. The child safety seat includes: a seat base defining a receiving groove on a front edge thereof; a buckle connected to the seat base through a crotch belt, and a shape of the buckle being matched with the receiving groove; and a seat cushion covering on the seat base and defining a slot to allow the buckle to pass through. When the buckle is no longer used, the buckle can be received in the receiving groove without removing the buckle, which does not affect the normal use of the seat base, and improves the convenience of using the child safety seat for users.

17 Claims, 8 Drawing Sheets

(56)                    References Cited

OTHER PUBLICATIONS

Office action mailed/issued on Dec. 12, 2022 for TW application No. 111121220, filing date Jun. 8, 2022, pp. 1-6.

Office action mailed/issued on Jun. 28, 2024 for CN application No. 202110642262.8, filing date Jun. 9, 2021, pp. 1~8.

Kindercentrumzilina, @kindercentrumzilina7685: "CYBEX Sirona Q-Isize Tutorial New", Oct. 16, 2018, YouTube video [online], Available from https://www.youtube.com/watch?v=tnt2bSvty5l. Screenshot taken at 2:53, 2:59, 2:37, 2:24, 2:20, 2:22 of the video., Oct. 16, 2018.

Cybex platinum, Sirona Q i-SIZE user guide, CYBEX GmbH, Germany, Product Owner's Manual [online], see PDF file p. 1-67 https://www.wekids.it/public/data/manuali/qgqpg-manuale-istruzioni-cibex-sirona-q-i-size-2018-cercaseggiolini.pdf ,2018.

Office action mailed/issued on Oct. 24, 2024 for DE application No. 10 2022 114 258.2, pp. 1~5.,Oct. 24, 2024.

* cited by examiner

50

30

72

60

70

40

80          42

CHILD SAFETY SEAT

BACKGROUND OF THE INVENTION

1. Field of the Invention

The present disclosure relates to seats of automobiles, and more particularly, to a child safety seat.

2. Description of the Prior Art

A child safety seat includes a seat body, a headrest installed on the upper end of seat body, a safety belt and a buckle installed on the seat body, which composes a five-point safety belt restraint system. According to relevant regulations, children must use the five-point seat belt restraint system before the age of four, and children can no longer use the five-point seat belt restraint system after the age of four. At this time, it is necessary to store the buckle. The buckle of the conventional child safety seat is usually detachable, the buckle is easily lost after disassembly and may not be available in feature use. When a family have children over and under the age of four and children use the same child safety seat, the child safety seat needs to be disassembled and assembled frequently, which is very inconvenient.

SUMMARY OF THE INVENTION

According to various embodiments of the present disclosure, a child safety seat is provided.

According to an aspect of the disclosure, a child safety seat includes: a seat base defining a receiving groove on a front edge of the seat base; a buckle connected to the seat base through a crotch belt, and a shape of the buckle being matched with the receiving groove; and a seat cushion covering on the seat base and defining a slot to allow the buckle to pass through.

According to an aspect of the disclosure, a child safety seat includes: a backrest; a seat base connected to the backrest and defining a receiving groove on an edge of the seat base away from the backrest; a buckle connected to the seat base and configured to be received in the receiving groove; and a seat cushion covering on the seat base and defining a slot to allow the buckle to pass through.

Details of one or more embodiments of the present disclosure will be given in the following description and attached drawings. Other features, objects and advantages of the present disclosure will become apparent from the description, drawings, and claims.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

DETAILED DESCRIPTION

The present disclosure will now be described in detail with reference to the accompanying drawings and embodiments in order to make the objects, technical solutions, and advantages of the present disclosure more clear. It should be understood that the specific embodiments described herein are only for explaining the present disclosure, and not intended to limit the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
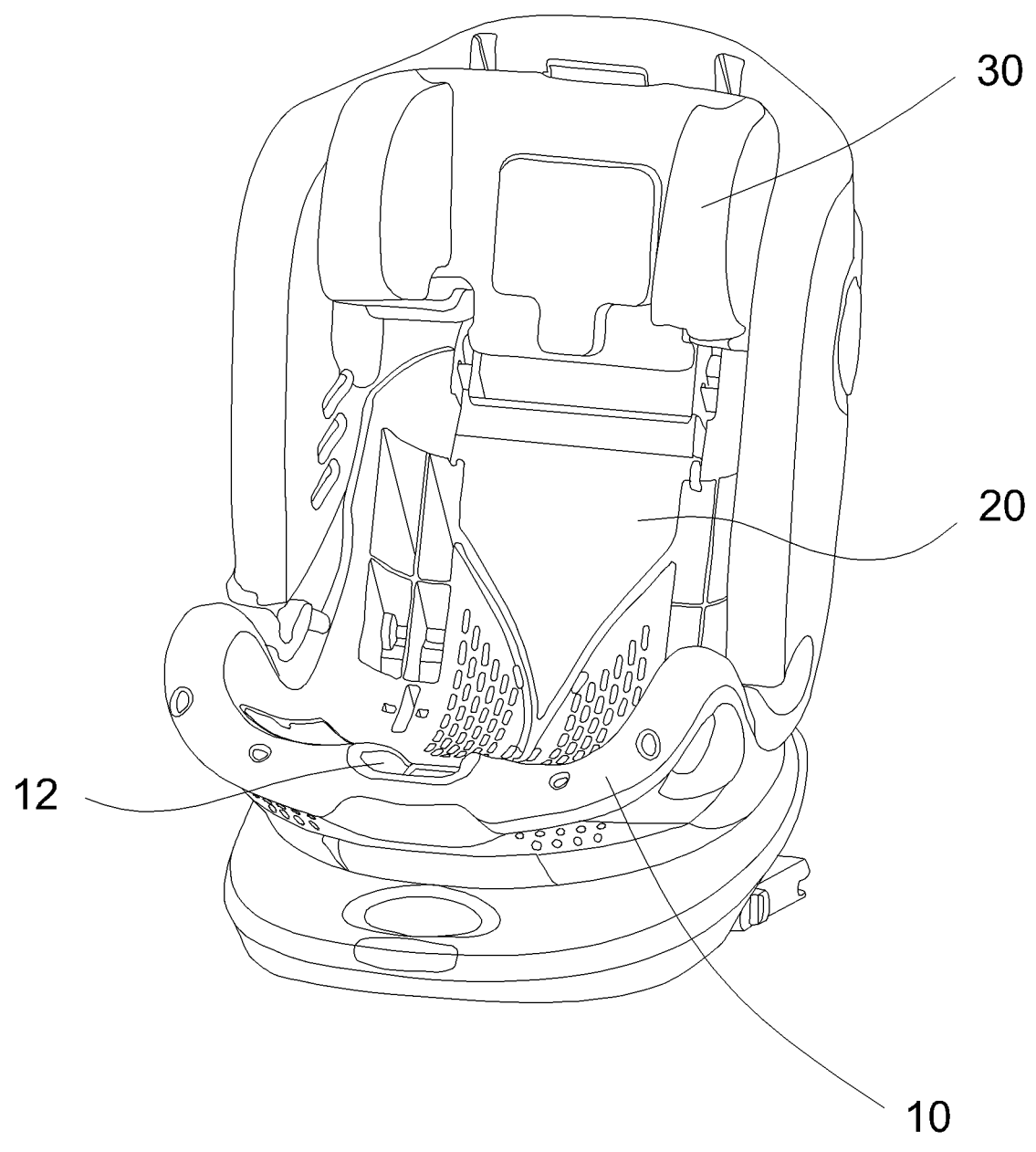
FIG. 1 is a perspective view of a frame of a child safety seat according to an embodiment.
Figure 2:
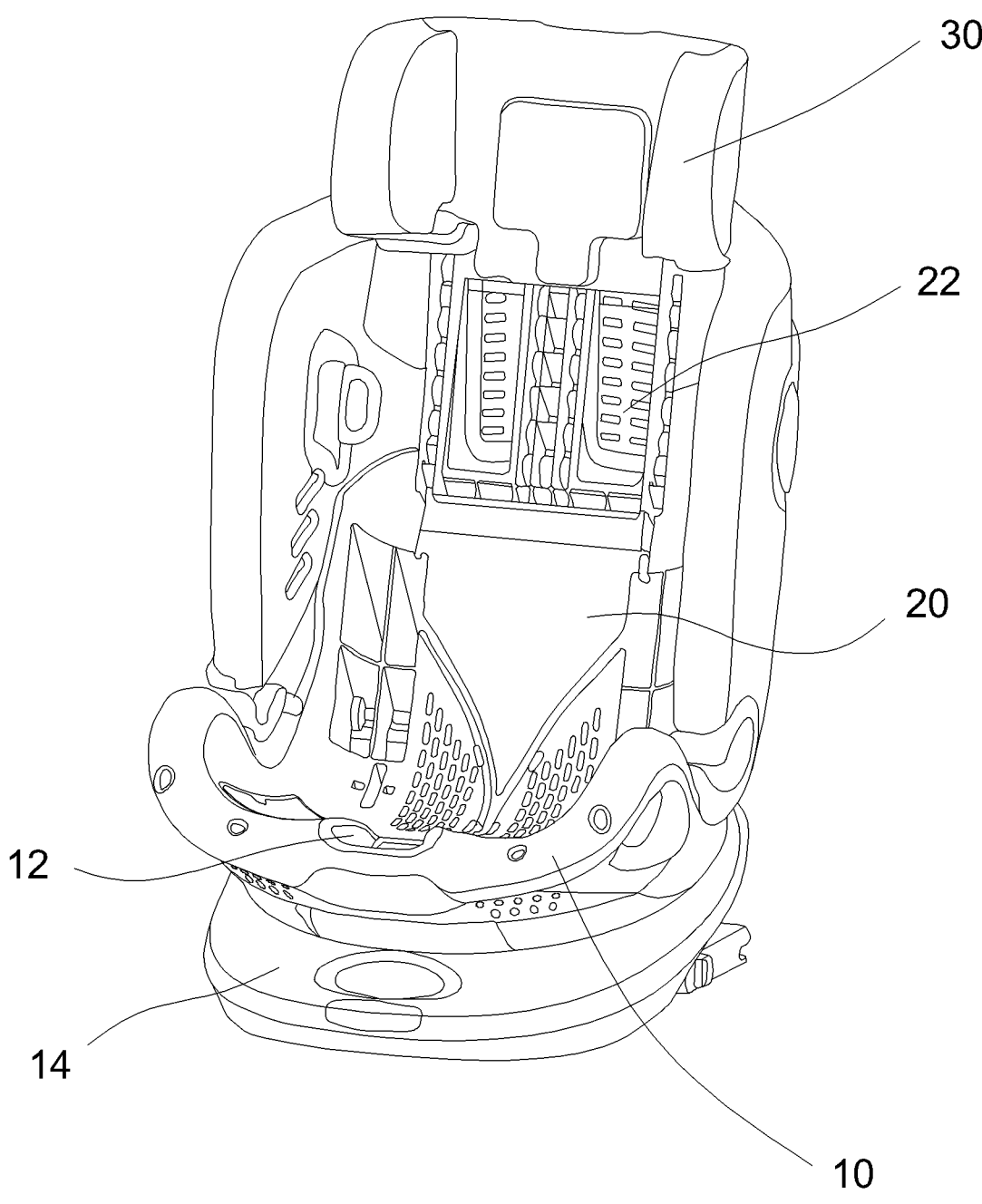
FIG. 2 is similar to FIG. 1, but with a headrest sliding to an upper end of a backrest.
Figure 3:
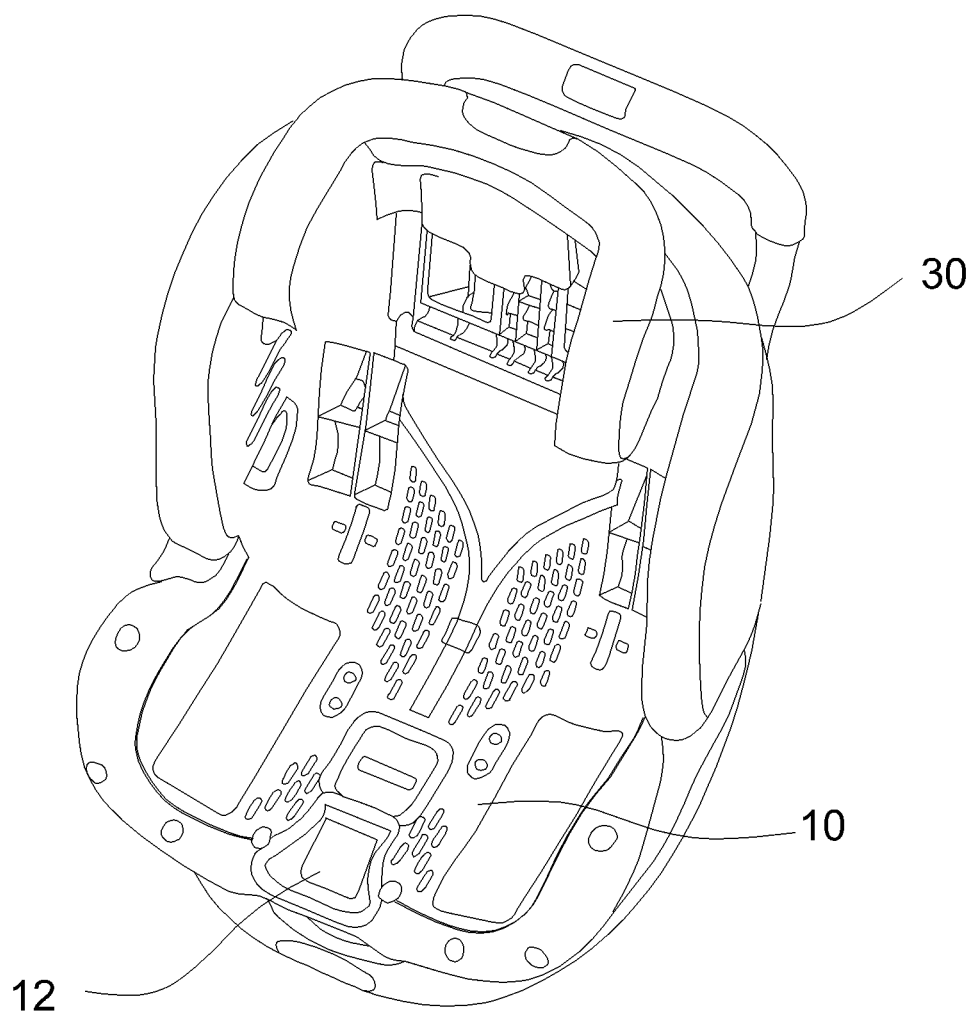
FIG. 3 is similar to FIG. 2, but viewed from a different aspect.

Referring to FIGS. 1 to 3, according to an embodiment, a frame of a child safety seat 100 after removing a surface cover (e.g. a fabric) is provided. The child safety seat 100 includes a seat base 10, a seat backrest 20, and a headrest 30.

The seat base 10 is configured to carry a hip of a child using the child safety seat 100, which has an ergonomic shape. A front edge of the seat base 10 defines a receiving groove 12 for receiving a buckle 60 (shown in FIG. 4). When the child sits on the seat base 10, the receiving groove 12 is located between two legs of the child. A groove of a conventional child safety seat for receiving a buckle is located below the hip of the child. The buckle may move back and forth in the groove during use of the conventional child safety seat, which causes children sitting in the child safety seat very uncomfortable. In addition, the groove located below the hip makes the thickness of the conventional child safety seat larger and the weight increase accordingly. In the illustrated embodiment, the buckle 60 received the receiving groove 12 is positioned at the front edge of the seat base 10 and between the legs of the child, so that on the one hand, it does not affect the child sitting in the child safety seat, on the other hand, it also saves space and reduce the thickness of the seat base 10. It should be understood that a rotatable or sliding cover plate can also be provided above the receiving groove 12. The child safety seat 100 further includes a pedestal 14 connected to the bottom of the seat base 12 for matching with seats of automobiles, so as to facilitate a detachable connection of the child safety seat 100 to the seat of the automobile.

The backrest 20 is integrally formed with the seat base 10 and extends upward from a rear end of the seat base 10. As shown in FIG. and FIG. 3, an upper portion of the backrest 20 defines two accommodating grooves 22 parallel to each other, and the two accommodating grooves 22 are configured to receive two shoulder belts 70 (shown in FIG. 4).

The headrest 30 is slidably arranged at the upper end of the backrest 20 through a mechanism such as a sliding rail, so as to facilitate the user to adjust the height of the headrest 30 to adapt to different heights of children. As shown in FIG. 1, when the headrest 30 slides to the lowest relative to the backrest 20, the accommodating groove 22 can be covered.

Figure 4:
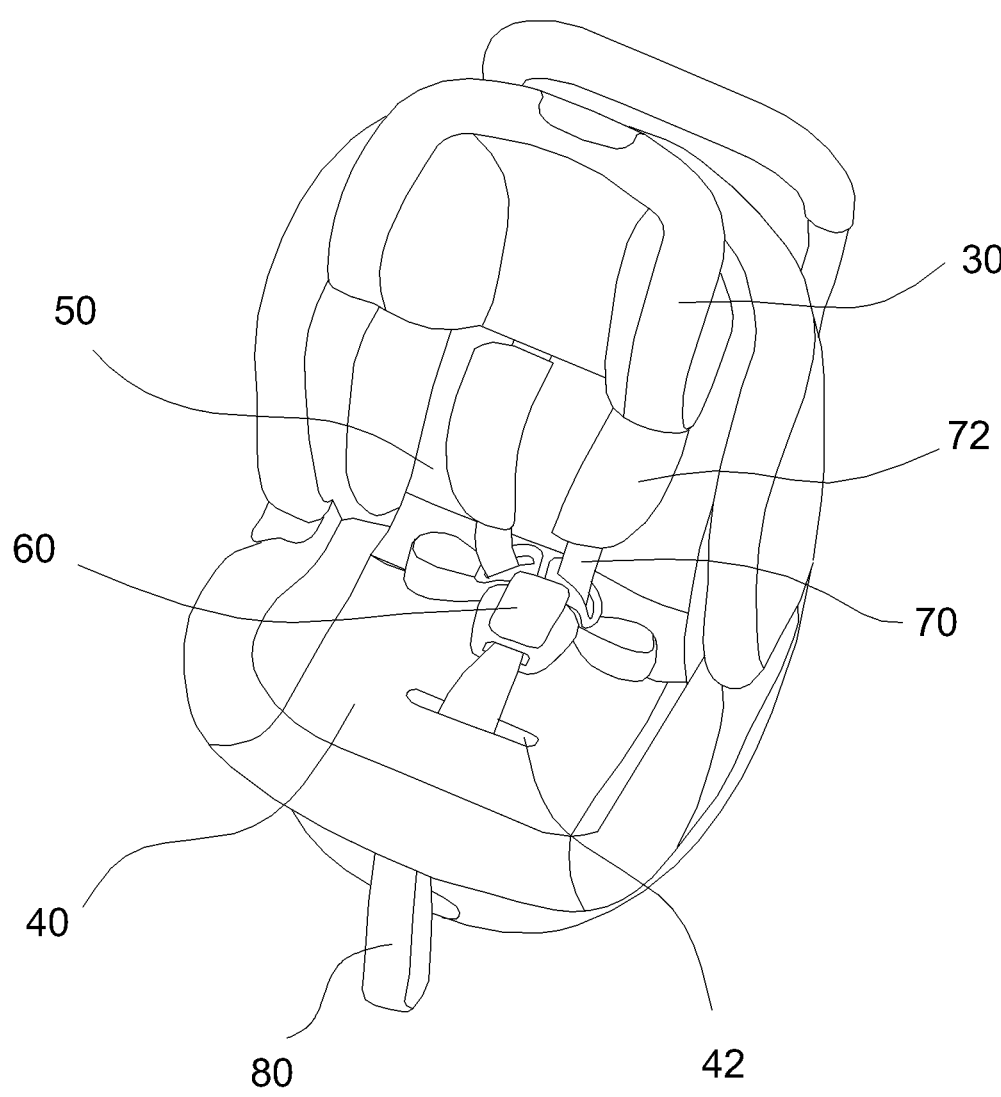
FIG. 4 is a perspective view of a child safety seat according to an embodiment.

Referring to FIG. 4, the child safety seat 100 is shown after the frame in FIGS. 1 to 3 is covered by the fabric. The child safety seat 100 further includes a seat cushion 40, a back cushion 50, the buckle 60, the shoulder belt 70, and an adjusting belt 80.

Figure 5:
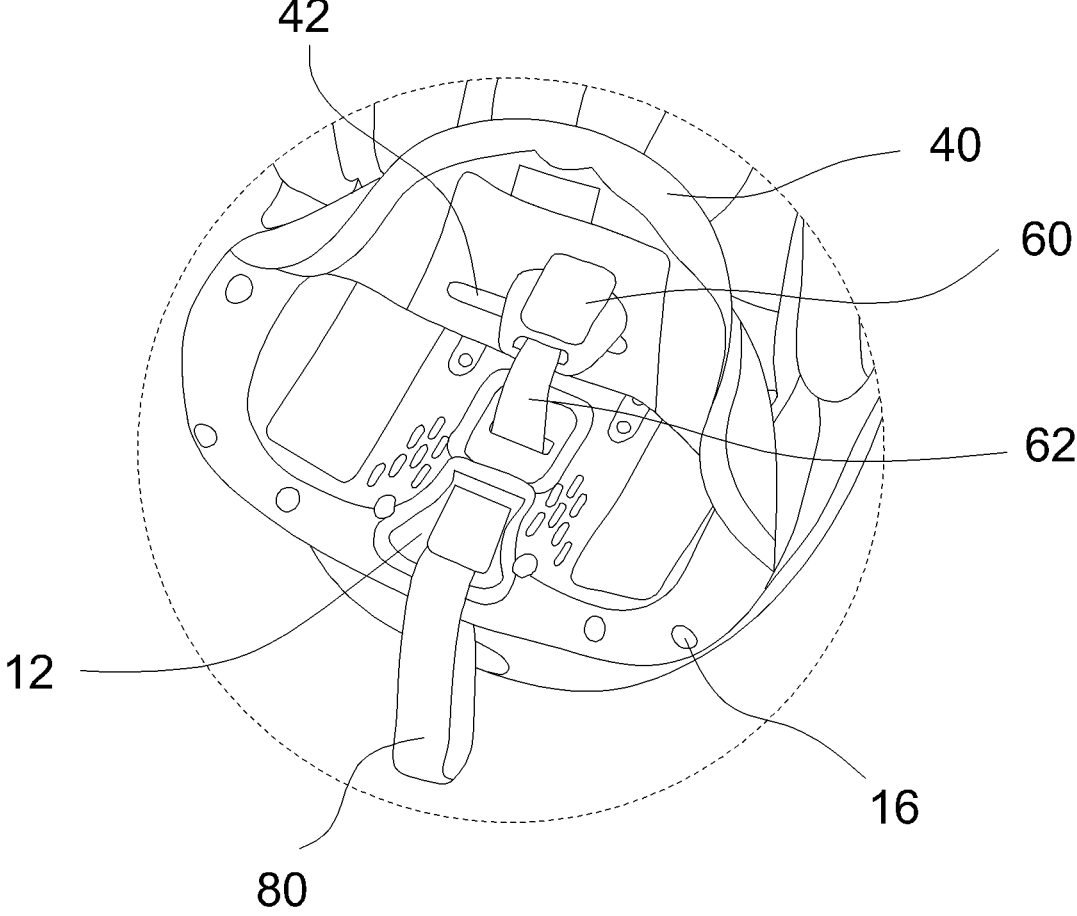
FIG. 5 is enlarged view of a buckle of the child safety seat in FIG. 4 in a first use state.

The seat cushion 40 may be made of soft material, and the seat cushion 40 can wrap and cover the seat base 10, so as to provide a more comfortable experience for the user. A middle portion of the seat cushion 40 defines a slot 42 extended along a transverse direction of the seat cushion 40. The slot 42 allows the buckle 60 to pass through. Referring to FIG. 5, an edge of the seat base 10 defines a plurality of snap holes 16 at intervals. An edge of the seat cushion 40 is provided with a plurality of snap buttons (not shown) corresponding to the plurality of snap holes 16, so that the seat cushion 40 is fixed and covered on the seat base 10.

Figure 6:
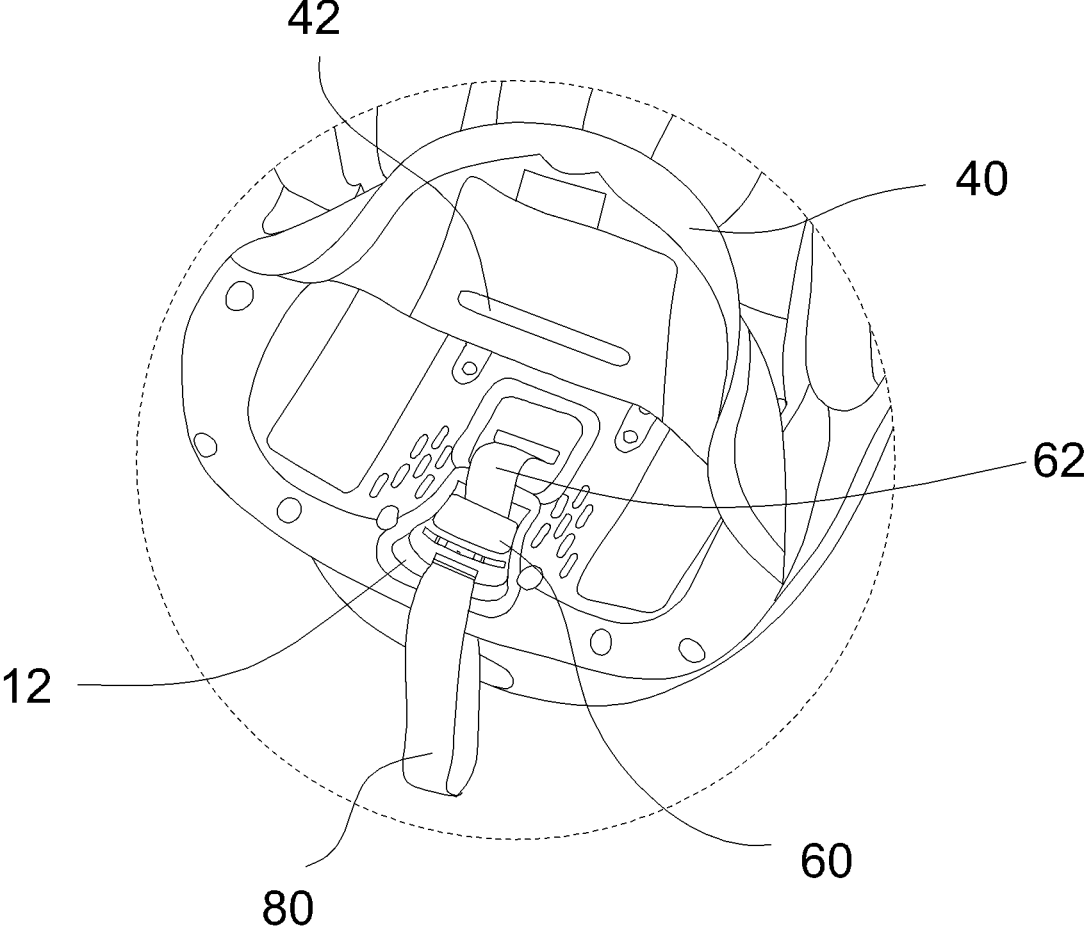
FIG. 6 is enlarged view of the buckle of the child safety seat in FIG. 4 in a second use state.

The buckle 60 is shaped substantially as an inverted trapezoid. One end of the buckle 60 is fixed to the middle of the seat base 10 through a crotch belt 62, so the buckle 60 can move freely within a range of the crotch belt 62 relative to the seat base 10. The crotch belt 62 is located between two legs of the child. As shown in FIG. 5 and FIG. 6, when the buckle 60 is about to be received in the receiving groove 12, the edge of the seat cushion 40 can be lifted upward, so that the receiving groove 12 on the seat base 10 can be exposed. The buckle 60 can then pass through the slot 42 in the middle of the seat cushion 40 and be placed in the receiving groove 12. Finally, the seat cushion 40 is put down, and recovered and fixed on the seat base 10 through the snap buttons. The shape of the receiving groove 12 is completely matched with the buckle 60. Therefore, when the buckle 60 is received in the receiving groove 12, the buckle 60 does not swing back and forth in the receiving groove 12, and an upper surface of the buckle 60 does not protrude from the surface of the seat base 10. Therefore, even if the seat cushion 40 has a small thickness, it does not cause unevenness to affect the sitting and lying of children.

Figure 7:
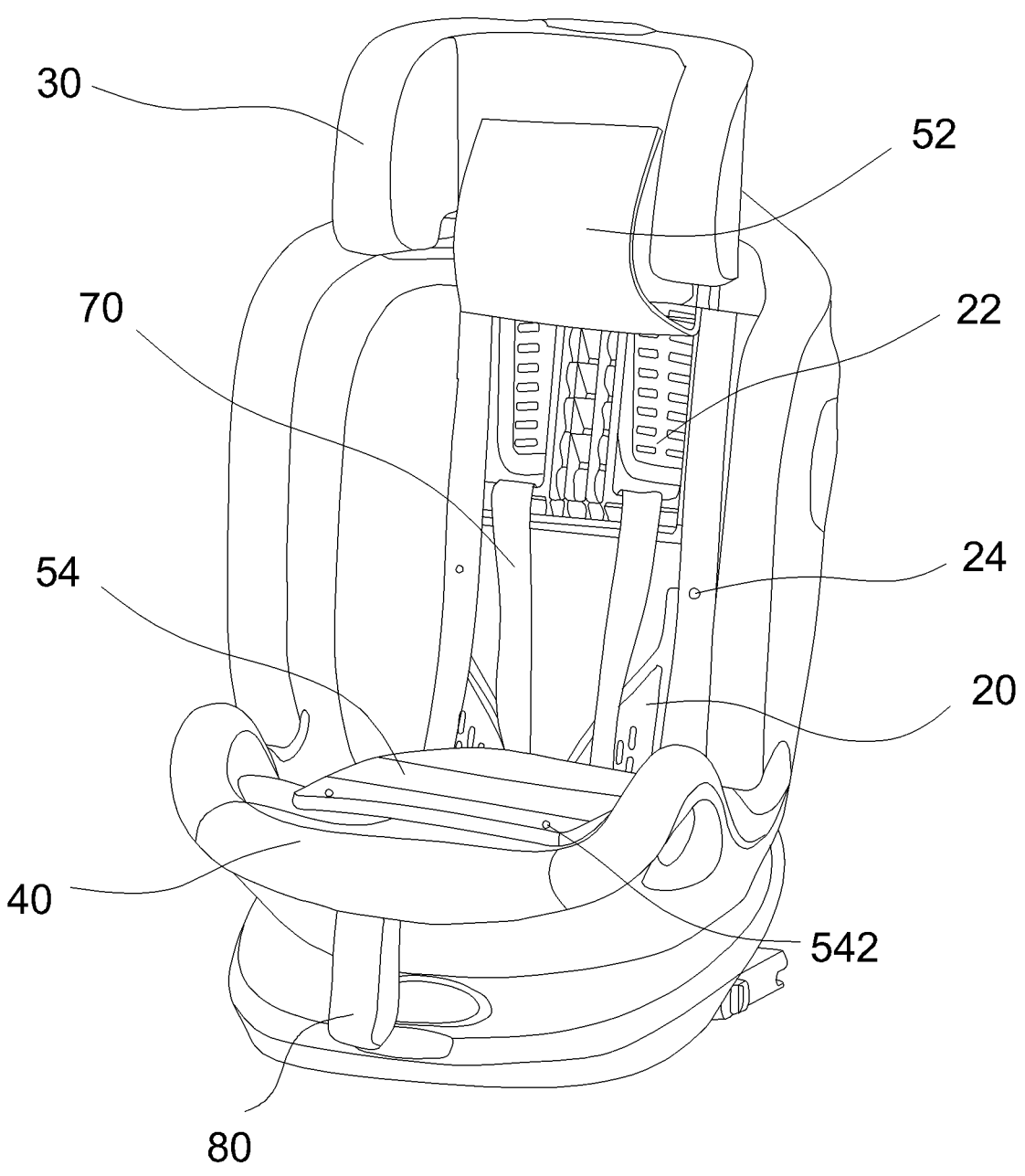
FIG. 7 is a perspective view of the child safety seat in FIG. 4 in another state.
Figure 8:
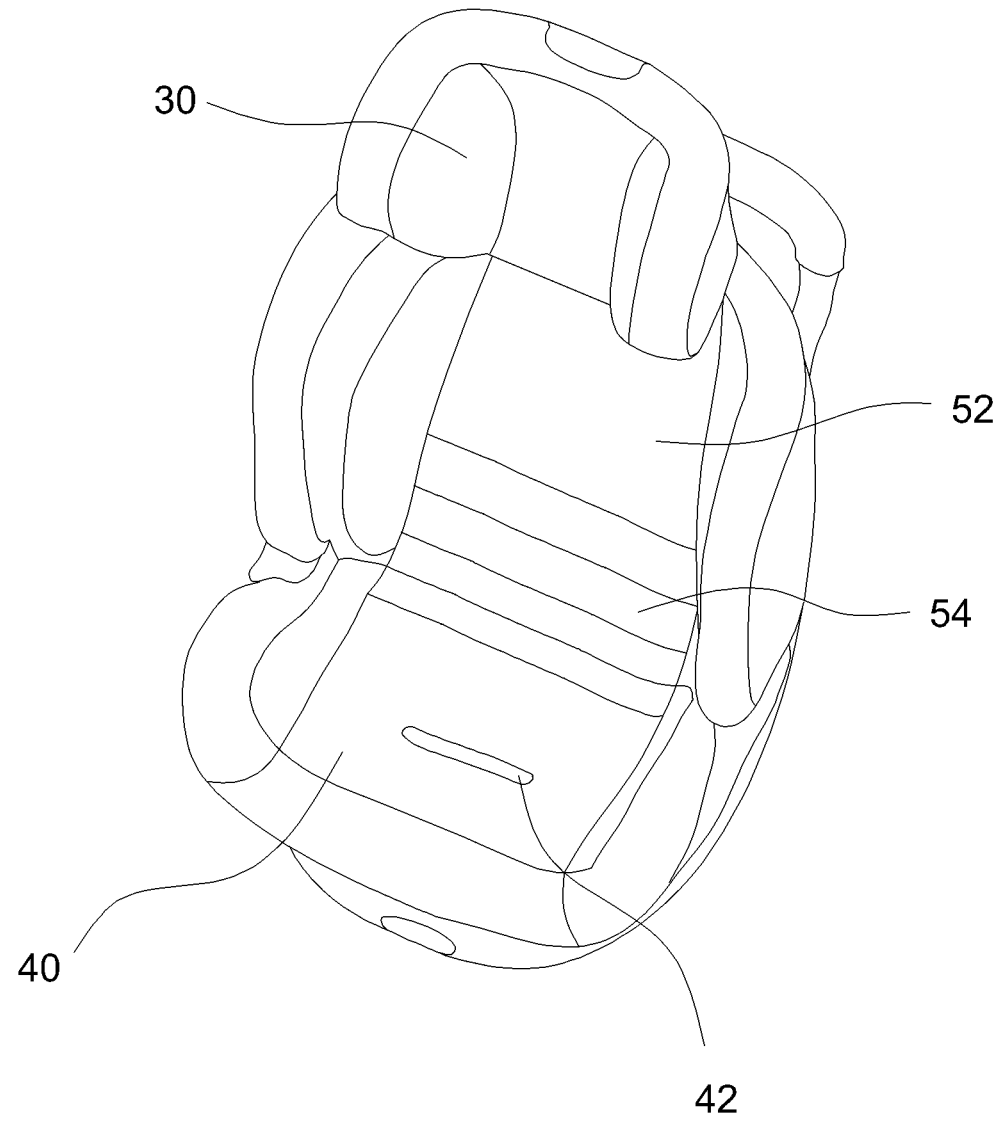
FIG. 8 is a perspective view of the child safety seat in FIG. 4 in another state.

Referring to FIGS. 7 and 8, the back cushion 50 detachably covers on the backrest 20. In this embodiment, the back cushion 50 includes an upper back cushion 52 and a lower back cushion 54. A lower end of the lower back cushion 54 is fixed to the seat cushion 40, and a plurality of male snap buttons 542 are fixed on the left and right edges of an upper end of the lower back cushion 54. A plurality of female snap fasteners 24 are fixed on the backrest 20 and matching with the male snap fasteners 542. Therefore, the lower back pad 54 is capable of switching between a normal use state attaching to the back 20 shown in FIG. 8 and a semi-detached state putting down shown in FIG. 7. In some embodiments, the male button 542 and the female button 24 can be replaced by other fasteners, such as magnetic sheet, Velcro, etc. An upper end of the upper back cushion 52 is connected to the headrest 30. In some embodiments, the upper back cushion 52 and the headrest 30 are integrally formed, such that the upper end of the upper back cushion 52 can move together with the headrest 30. In some embodiments, the upper end of the upper back cushion 52 can be separated from the headrest 30 and fixed on the back 20. A lower end of the upper back pad 52 is movable. When the lower back cushion 54 is attached to the backrest 20, the lower end of the upper back cushion 52 is located in front of the lower back cushion 54, so that the upper back cushion 52 can cover the accommodating groove 22. A conjunction between the upper back cushion 52 and the headrest 30 defines a shoulder belt slot (not labeled) allowing the shoulder belt 70 to pass through. It should be understood that in other embodiments, the child safety seat 100 can include only one lower back cushion 54, and the upper back cushion 52 can be omitted at this time.

Referring to FIG. 4 again, in this embodiment, the shoulder belts 70 includes a left shoulder belt and a right shoulder belt. The shoulder belt 70 is made of nylon. The upper end of the shoulder belt 70 can pass through the shoulder belt slot on the upper back cushion 52 and the accommodating groove 22 successively, and the shoulder belt 70 is fixed to one end of the adjusting belt 80 at a rear side of the backrest 20. Therefore, a tightness of the shoulder belt 70 can be adjusted by pulling the adjusting belt 80. The middle portion of the shoulder belt 70 is normally located in front of the lower back cushion 54 and can be detachably connected to the buckle 60 through a tab. In this embodiment, in order to prevent the sharp edge of the shoulder belt 70 from damaging the neck and other parts of the child, the shoulder belt 70 is sleeved with a shoulder belt sheath 72. As shown in FIG. 5 and FIG. 6, the other end of the adjusting belt 80 extends downward from a rear direction of the backrest 20, bypasses the lower portion of the seat part 10, and is fixed in the receiving groove 12 of the seat base 10.

When a young child uses the child safety seat 100, as shown in FIG. 4, the child needs to be protected by both of the shoulder belt 70 and the crotch belt 62. At this time, the buckle 60 and the two shoulder belts 70 are exposed, that is, the two shoulder belts 70 are positioned in a first position on the surface of the lower back cushion 54, and the lower end of the shoulder belt 70 is connected to the buckle 60, so as to provide a five-point protection for the two shoulders and crotch of the child.

As the children grow older, they may no longer need the protection of shoulder belt 70 and crotch belt 62, but only use a three-point seat belt of the automobile to meet the safety requirements. At this time, the shoulder belt 70 and the buckle 60 can be stored. As shown in FIGS. 5 to 8, the tab of the shoulder belt 70 is firstly detached from the buckle 60, and then the edge of the seat cushion 40 is lifted upward to expose the receiving groove 12. The buckle 60 can then be passed through the slot 42 in the middle of the seat cushion 40 and located in the receiving groove 12. Then, the seat cushion 40 is put down, and recovered and fixed on the seat base 10 through the snap buttons. Next, the headrest 30 is pushed upward to the highest position to remove the shielding of the upper back cushion 52 from the lower back cushion 54. Then, the lower back cushion 54 is flipped down and the upper back pad 52 is flipped up to expose the accommodating groove 22. Then, the shoulder belt 70 can be separated from the shoulder belt slot, and the shoulder belt sheath 72 and the tab of the shoulder belt 70 can be inserted into the accommodating groove 22, so that the shoulder belt 70 is positioned in a second position received the accommodating groove 22. Finally, the upper back cushion 52 and the lower back cushion 54 are flipped to their original positions to hide and store the shoulder strap 70, which will not affect the sitting posture of the child.

The child safety seat 100 according to the embodiments includes the seat base 10 defining the receiving groove 12 for storing the buckle 60. When the buckle 60 is no longer used, the buckle 60 can be received in the receiving groove 12 without removing the buckle 60, which does not affect the normal use of the seat base 10, and improves the convenience of using the child safety seat 100 for users.

Although the respective embodiments have been described one by one, it shall be appreciated that the respective embodiments will not be isolated. Those skilled in the art can apparently appreciate upon reading the disclosure of this invention that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure. Therefore, the protection scope of the present disclosure shall be subject to the protection scope of the appended claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat comprising:
   a seat base defining a receiving groove on a front edge of the seat base, the seat base further defining a crotch belt hole spaced apart from the receiving groove, and the receiving groove being located in front of the crotch belt hole;
   a buckle connected to the seat base through a crotch belt, and a shape of the buckle being matched with the receiving groove;
   a seat cushion covering on the seat base and defining a slot to allow the buckle to pass through;

a backrest connected to the seat base and defining an accommodating groove;
   a back cushion detachably covering the backrest to cover the accommodating groove;
   a shoulder belt detachably connected to the buckle, the shoulder belt being capable of switching between a first position on a surface of the back cushion and a second position in the accommodating groove, the accommodating groove being located above a through hole, through which the shoulder belt passes, of the backrest;
   a headrest slidably connected to the backrest and configured to selectively cover the back cushion, wherein when the headrest slides to a lowest position relative to the backrest, the accommodating groove is covered by the headrest; and
   an adjusting belt, wherein one end of the adjusting belt is fixed in the receiving groove, and the other end of the adjusting belt extends beneath the seat base.

2. The child safety seat of claim 1, wherein one end of the back cushion is fixed to the seat cushion, and the other end of the back cushion is detachably fixed on the backrest through a fastener.

3. The child safety seat of claim 1, wherein the back cushion comprises a lower back cushion and an upper back cushion, a lower end of the lower back cushion is fixed to the cushion, an upper end of the lower back cushion is detachably fixed on the backrest by a snap button, an upper end of the upper back cushion is connected to the headrest, a lower end of the upper back cushion is located in front of the lower back cushion, and the upper back cushion is capable of covering the accommodating groove.

4. The child safety seat of claim 3, wherein a conjunction between the upper back cushion and the head restraint defines a shoulder belt slot allowing the shoulder belt to pass through.

5. The child safety seat of claim 1, wherein the shoulder belt is sleeved with a shoulder belt sheath, and the accommodating groove is further configured to receive the shoulder belt sheath.

6. The child safety seat of claim 1, wherein the other end of the adjusting belt is connected to the shoulder belt at a rear portion of the backrest.

7. The child safety seat of claim 1, further comprising a pedestal connected to a bottom of the seat base and matching with a seat of an automobile.

8. The child safety seat of claim 1, wherein an edge of the seat base defines a plurality of snap holes at intervals, and an edge of the seat cushion is provided with a plurality of snap buttons corresponding to the plurality of snap holes, so that the seat cushion is fixed and covered on the seat base.

9. A child safety seat comprising:
   a backrest defining an accommodating groove;
   a seat base connected to the backrest and defining a receiving groove on an edge of the seat base away from the backrest;
   a buckle connected to the seat base and configured to be received in the receiving groove, the seat base further defining a crotch belt hole spaced apart from the receiving groove;
   a seat cushion covering on the seat base and defining a slot to allow the buckle to pass through;
   a back cushion detachably covering the backrest to cover the accommodating groove;
   a shoulder belt detachably connected to the buckle, the shoulder belt being capable of switching between a first position on a surface of the back cushion and a second position in the accommodating groove, the accommodating groove being located above a through hole, through which the shoulder belt passes, of the backrest;

a headrest slidably connected to the backrest and configured to selectively cover the back cushion, wherein when the headrest slides to a lowest position relative to the backrest, the accommodating groove is covered by the headrest; and an adjusting belt, wherein one end of the adjusting belt is fixed in the receiving groove, and the other end of the adjusting belt extends beneath the seat base.

10. The child safety seat of claim 9, wherein one end of the back cushion is fixed to the seat cushion, and the other end of the back cushion is detachably fixed on the backrest through a fastener.

11. The child safety seat of claim 9, wherein the back cushion comprises a lower back cushion and an upper back cushion, a lower end of the lower back cushion is fixed to the cushion, an upper end of the lower back cushion is detachably fixed on the backrest by a snap button, an upper end of the upper back cushion is connected to the headrest, a lower end of the upper back cushion is located in front of the lower back cushion, and the upper back cushion is capable of covering the accommodating groove.

12. The child safety seat of claim 9, wherein the shoulder belt is sleeved with a shoulder belt sheath, and the accommodating groove is further configured to receive the shoulder belt sheath.

13. The child safety seat of claim 9, the other end of the adjusting belt is connected to the shoulder belt at a rear portion of the backrest.

14. The child safety seat of claim 9, further comprising a pedestal connected to a bottom of the seat base and matching with a seat of an automobile.

15. The child safety seat of claim 9, wherein an edge of the seat base defines a plurality of snap holes at intervals, and an edge of the seat cushion is provided with a plurality of snap buttons corresponding to the plurality of snap holes, so that the seat cushion is fixed and covered on the seat base.

16. A child safety seat comprising:

a backrest defining an accommodating groove;

a seat base defining a receiving groove on a front edge of the seat base, the seat base further defining a crotch belt hole spaced apart from the receiving groove, and the receiving groove being located in front of the crotch belt hole;

a buckle connected to the seat base through a crotch belt extending through the crotch belt hole, and the buckle being configured to be received in the receiving groove;

a seat cushion covering on the seat base and defining a slot to allow the buckle to pass through;

a back cushion detachably covering the backrest to cover the accommodating groove;

a shoulder belt detachably connected to the buckle, the shoulder belt being capable of switching between a first position on a surface of the back cushion and a second position in the accommodating groove, and the accommodating groove being located above a through hole, through which the shoulder belt passes, of the backrest;

a headrest slidably connected to the backrest and configured to selectively cover the back cushion, wherein when the headrest slides to a lowest position relative to the backrest, the accommodating groove is covered by the headrest; and an adjusting belt, wherein one end of the adjusting belt is fixed in the receiving groove, and the other end of the adjusting belt extends beneath the seat base.

17. The child safety seat of claim 16, wherein an edge of the seat base defines a plurality of snap holes at intervals, and an edge of the seat cushion is provided with a plurality of snap buttons corresponding to the plurality of snap holes, so that the seat cushion is fixed and covered on the seat base.

* * * * *